(12) United States Patent
Tasaka et al.

(10) Patent No.: US 12,731,409 B2
(45) Date of Patent: Sep. 8, 2026

(54) MONITORING SYSTEM AND MONITORING METHOD

(71) Applicants: TOYOTA JIDOSHA KABUSHIKI KAISHA, Toyota (JP); ARITHMER INC., Tokyo (JP)

(72) Inventors: Masahiro Tasaka, Nisshin (JP); Keizo Fukushima, Nagoya (JP); Koichi Harada, Tokyo (JP); Masami Mori, Tokyo (JP)

(73) Assignees: TOYOTA JIDOSHA KABUSHIKI KAISHA, Toyota (JP); ARITHMER INC., Tokyo (JP)

( * ) Notice: Subject to any disclaimer, the term of this patent is extended or adjusted under 35 U.S.C. 154(b) by 270 days.

(21) Appl. No.: 18/438,850

(22) Filed: Feb. 12, 2024

(65) Prior Publication Data

US 2024/0320984 A1 Sep. 26, 2024

(30) Foreign Application Priority Data

Mar. 23, 2023 (JP) ................................ 2023-046851

(51) Int. Cl.
*G06V 20/58* (2022.01)

(52) U.S. Cl.
CPC .......... *G06V 20/58* (2022.01); *G06V 2201/08* (2022.01)

(58) Field of Classification Search
CPC ..... G06V 20/58; G06V 2201/08; G06V 10/22
See application file for complete search history.

(56) References Cited

U.S. PATENT DOCUMENTS

2016/0001705 A1* 1/2016 Greenwood ........... H04N 23/54 348/148
2016/0101730 A1* 4/2016 Shehan ................... G01S 13/88 340/431
2017/0001566 A1* 1/2017 Lu ............................. B60R 1/26
2019/0325233 A1* 10/2019 Broll ....................... B60R 11/04
2020/0010018 A1* 1/2020 Maruoka ................. B60R 1/003
2021/0357663 A1* 11/2021 Okada ................. B60W 60/001
2022/0108553 A1* 4/2022 Natsume .............. G06V 20/588
2022/0396209 A1 12/2022 Sharma et al.

(Continued)

FOREIGN PATENT DOCUMENTS

JP 2010-244128 A 10/2010
JP 2020-161952 A 10/2020

(Continued)

*Primary Examiner* — Bobbak Safaipour
(74) *Attorney, Agent, or Firm* — Oliff PLC

(57) ABSTRACT

A monitoring system according to the present disclosure includes: an image acquiring section; a determining section; an area setting section; and a detecting section. The image acquiring section acquires images obtained by photographing left and right rear sides of a towing vehicle, respectively. The determining section determines whether a towed vehicle towed by the towing vehicle is present in the images. When the determining section determines that the towed vehicle is present in the image, the area setting section sets a dangerous area having a curved shape on one lateral side of the left lateral side and the right lateral side of the towing vehicle and the towed vehicle, the one lateral side being a side where the image in which the towed vehicle is determined to be present is photographed. The detecting section detects a collision hazardous object present in the dangerous area.

4 Claims, 5 Drawing Sheets

(56) References Cited

U.S. PATENT DOCUMENTS

| | | | | |
|---|---|---|---|---|
| 2024/0054897 | A1* | 2/2024 | Shoji | B60W 50/14 |
| 2024/0203259 | A1* | 6/2024 | Baek | G08G 1/163 |
| 2025/0002013 | A1* | 1/2025 | Tsuchiya | G08G 1/16 |
| 2025/0085390 | A1* | 3/2025 | Tsuchiya | G08G 1/16 |

FOREIGN PATENT DOCUMENTS

| | | | |
|---|---|---|---|
| JP | 2021-509376 | A | 3/2021 |
| JP | 2022-189740 | A | 12/2022 |
| JP | 2023-048406 | A | 4/2023 |
| WO | 2019/083912 | A1 | 5/2019 |

* cited by examiner

FIG. 3A
FIG. 3B
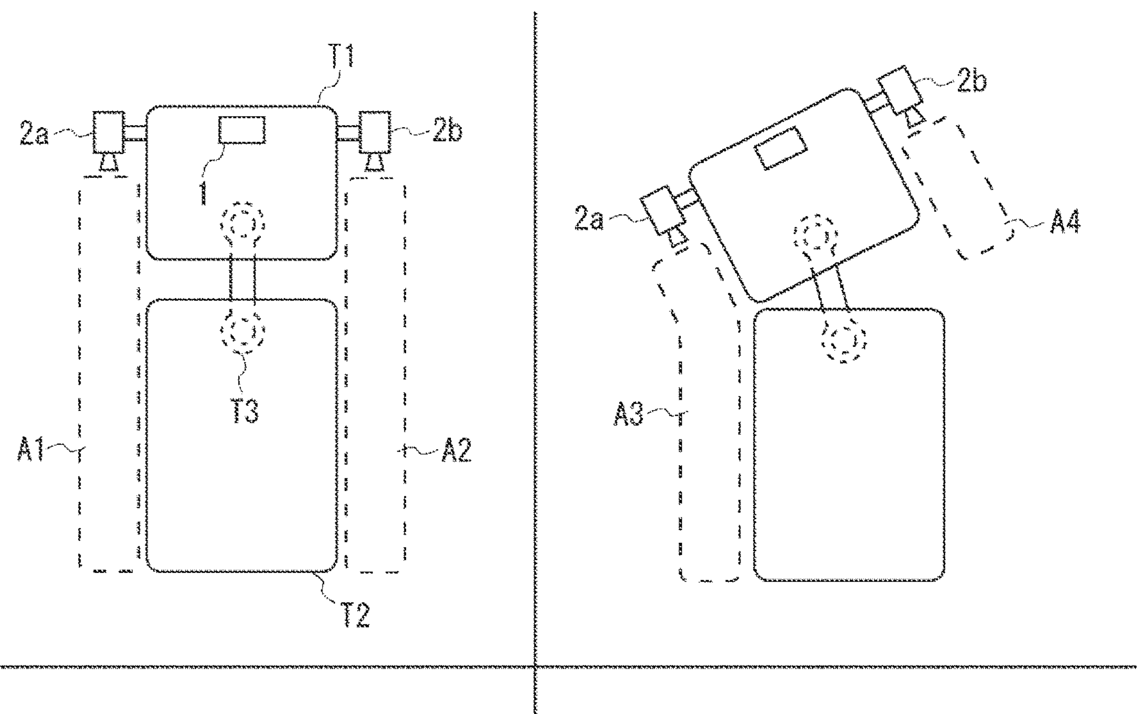
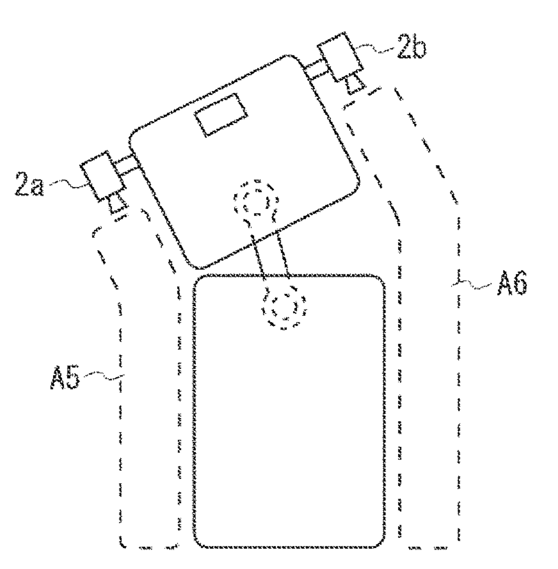
FIG. 3C

FIG. 5A
FIG. 5B
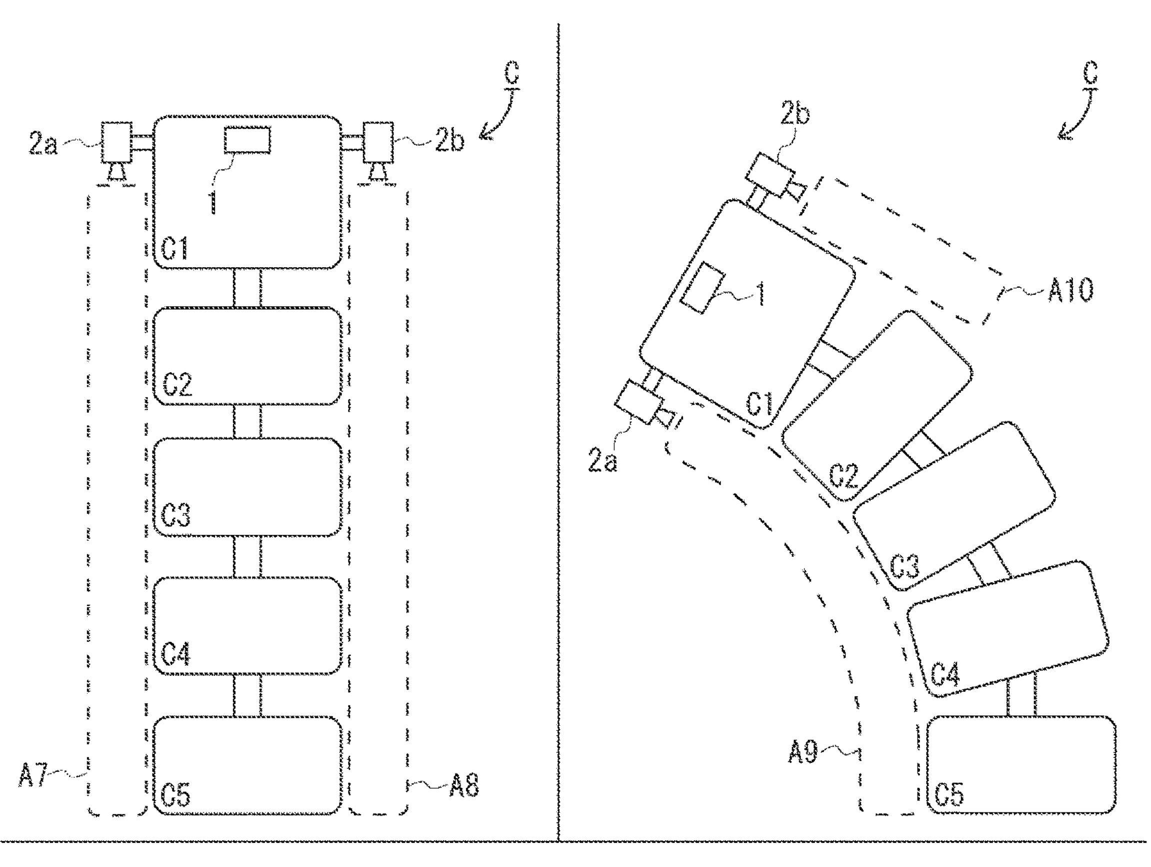
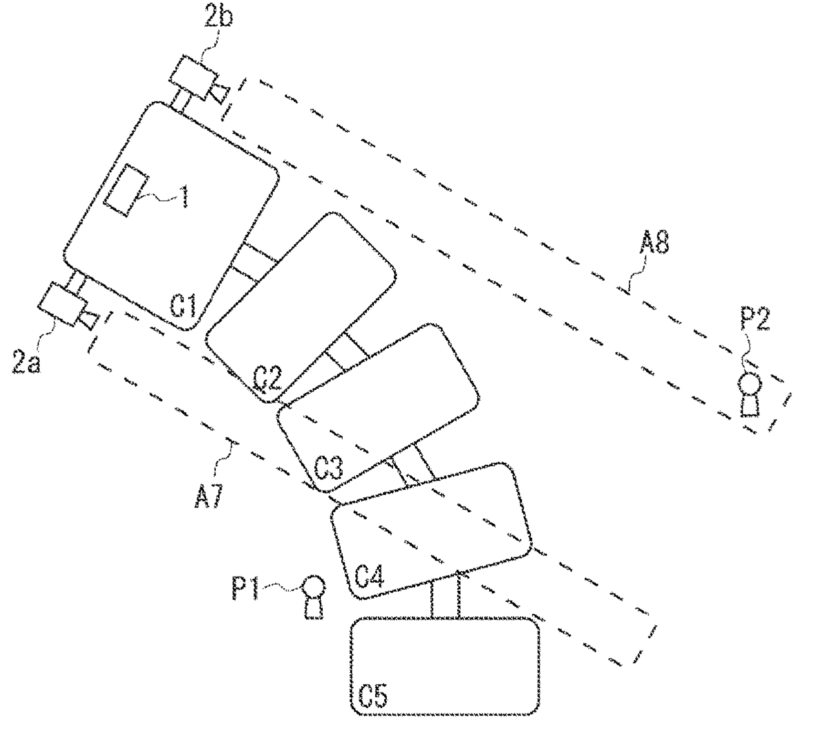
FIG. 5C

MONITORING SYSTEM AND MONITORING METHOD

CROSS-REFERENCE TO RELATED APPLICATION

This application claims priority to Japanese Patent Application No. 2023-046851 filed on Mar. 23, 2023, incorporated herein by reference in its entirety.

BACKGROUND

1. Technical Field

The present disclosure relates to a monitoring system and a monitoring method.

2. Description of Related Art

Japanese Unexamined Patent Application Publication No. 2021-509376 describes a collision prevention system for an articulated vehicle. The collision prevention system described in JP 2021-509376 A determines whether or not an object detected by a sensor is a part of the vehicle body of the articulated vehicle, depending on the connection angle between vehicles included in the articulated vehicle.

SUMMARY

In the meantime, in an articulated vehicle, that is, a vehicle including a towing vehicle and a towed vehicle, to which the collision prevention system as described in JP 2021-509376 A is applied, the importance of areas where attention should be paid to avoid contact with other objects varies depending on the traveling direction and the turning angle of the vehicle.

For example, in the case in which the towing vehicle and the towed vehicle move forward while turning, the risk of contact with an object present in the outer wheel direction decreases, but the risk of contact with an object present in the inner wheel direction increases. Hence, in this case, it is necessary for the collision prevention system to put more weight on detection of the object present in the inner wheel direction than on detection of the object present in the outer wheel direction.

Unfortunately, since the sensor included in the collision prevention system described in JP 2021-509376 A detects an object present within a constant range all the time, this system cannot put weight on detection accuracy for each area depending on the situation.

Consequently, in the collision prevention system described in JP 2021-509376 A, objects with a high risk of collision may not be properly detected, or objects with a low risk of collision may be excessively detected. That is, the collision prevention system described in JP 2021-509376 A has a problem that detection accuracy of a collision hazardous object cannot be sufficiently improved.

The present disclosure has been made to solve the above problem and has an object to provide a monitoring system and a monitoring method capable of enhancing detection accuracy of a collision hazardous object.

A monitoring system according to one aspect of the present disclosure is a monitoring system including: an image acquiring section that acquires images obtained by photographing a left rear side and a right rear side of a towing vehicle, respectively; a determining section that determines whether or not a towed vehicle towed by the towing vehicle is present in the respective images; an area setting section that, when the determining section determines that the towed vehicle is present in the image, sets a dangerous area having a curved shape extending along lateral surfaces of the towing vehicle and the towed vehicle on one lateral side of a left lateral side and a right lateral side of the towing vehicle and the towed vehicle, the one lateral side being a side where the image in which the towed vehicle is determined to be present is photographed; and a detecting section that detects a collision hazardous object present in the dangerous area.

A monitoring method according to one aspect of the present disclosure is a monitoring method in which a computer executes: acquiring images obtained by photographing a left rear side and a right rear side of a towing vehicle, respectively; determining whether or not a towed vehicle towed by the towing vehicle is present in the respective images; when the towed vehicle is determined to be present in the image, setting a dangerous area having a curved shape extending along lateral surfaces of the towing vehicle and the towed vehicle on one lateral side of a left lateral side and a right lateral side of the towing vehicle and the towed vehicle, the one lateral side being a side where the image in which the towed vehicle is determined to be present is photographed; and detecting a collision hazardous object present in the dangerous area.

According to the present disclosure, it is possible to provide the monitoring system and the monitoring method capable of enhancing detection accuracy of a collision hazardous object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a schematic overhead view for describing the configuration of an area setting section according to the first embodiment;

FIG. 3B is a schematic overhead view for describing the configuration of the area setting section according to the first embodiment;

FIG. 3C is a schematic overhead view for describing the configuration of the area setting section according to the first embodiment;

FIG. 5A is a schematic overhead view for describing the configuration of a monitoring system according to a second embodiment;

FIG. 5B is a schematic overhead view for describing the configuration of the monitoring system according to the second embodiment; and FIG. 5C is a schematic overhead view for describing the configuration of the monitoring system according to the second embodiment.

DETAILED DESCRIPTION OF EMBODIMENTS

First Embodiment

Configuration of Monitoring System

Figure 1:
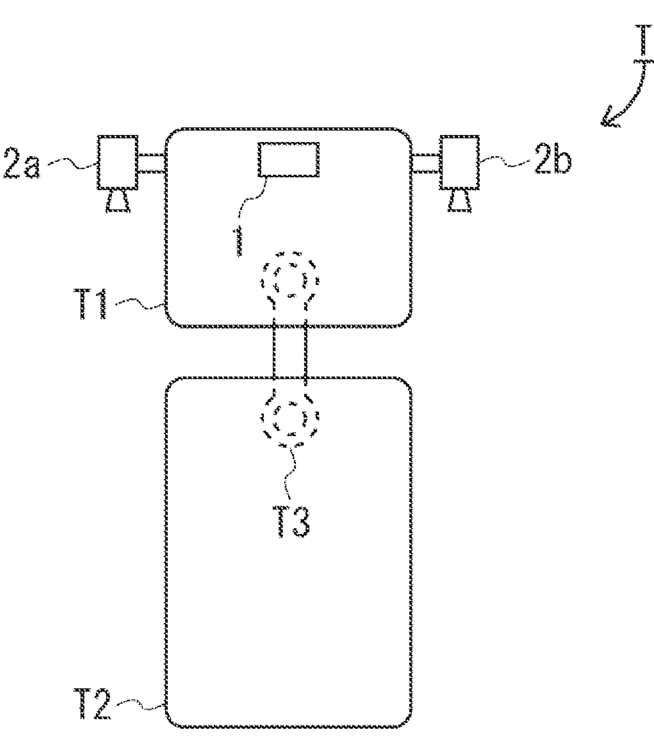
FIG. 1 is a schematic overhead view for describing the configuration of a monitoring system according to a first embodiment.

Hereinafter, a first embodiment according to the present disclosure will be described in detail with reference to the drawings. First, the configuration of the monitoring system according to the present embodiment will be described in detail. FIG. 1 is a schematic overhead view for describing the configuration of the monitoring system according to the first embodiment.

A monitoring system 100 according to the first embodiment is introduced in a truck T that includes: a towing vehicle T1; a towed vehicle T2; and a connection part T3, as shown in FIG. 1.

The monitoring system 100 according to the present embodiment is introduced in the truck T; however, the vehicle that can introduce the monitoring system according to the present disclosure is not limited to a truck, and the monitoring system according to the present embodiment may be introduced in any vehicle as long as the vehicle includes a towing vehicle and one or more towed vehicles towed by the towing vehicle. For example, the monitoring system according to the present disclosure may be introduced to a vehicle, such as a transport vehicle operated in a factory, including one towing vehicle towing a plurality of towed vehicles in a row.

The towing vehicle T1 is an automobile connected to the towed vehicle T2 via the connection part T3. The towing vehicle T1 includes a power engine and travels while towing the towed vehicle T2.

The towed vehicle T2 is a cargo vehicle connected to the towing vehicle T1 via the connection part T3. The towed vehicle T2 includes no power engine and travels by being towed by the towing vehicle T1.

The connection part T3 connects the towing vehicle T1 and the towed vehicle T2 together. The connection part T3 connects the towing vehicle T1 and the towed vehicle T2 such that these vehicles are rotatable when viewed from the connection part T3.

The monitoring system 100 according to the first embodiment detects a collision hazardous object present in the vicinity of the truck T. When the monitoring system 100 detects the collision hazardous object, the monitoring system 100 notifies a driver of the truck T of a warning.

The collision hazardous object referred to herein denotes any object having a risk of colliding against the truck T, and may be, for example, a human such as a pedestrian, a mobile object such as an automobile other than the truck T, or may be an object such as a road sign.

Figure 2:
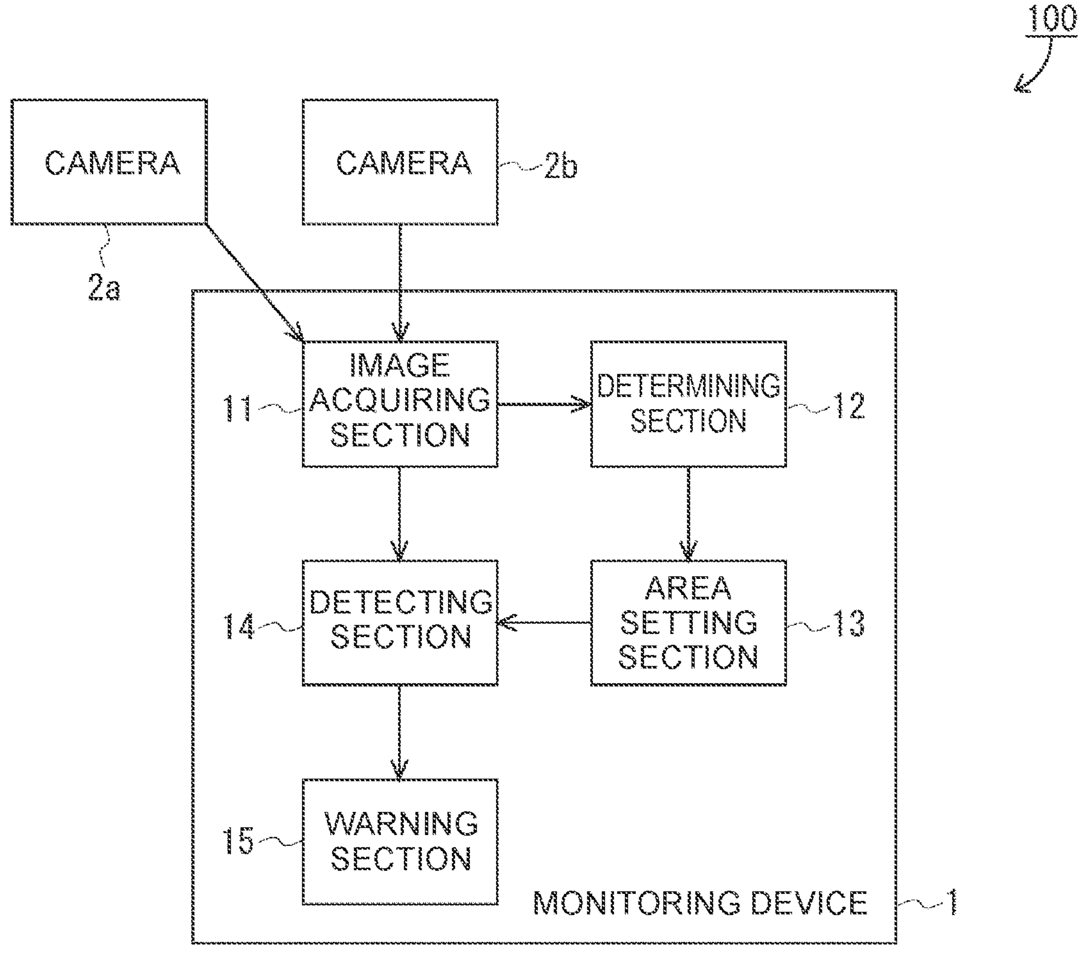
FIG. 2 is a block diagram showing the configuration of the monitoring system according to the first embodiment.

FIG. 2 is a block diagram showing the configuration of the monitoring system according to the first embodiment. The monitoring system 100 according to the first embodiment includes: a monitoring device 1; a first camera 2*a*; and a second camera 2*b*.

The first camera 2*a* and the second camera 2*b* are cameras attached to the lateral parts of the truck T, and photograph the left rear side and the right rear side of the towing vehicle T1, respectively. The first camera 2*a* and the second camera 2*b* output photographed images to the monitoring device 1.

Naturally, the terms of first and second are for convenience, and a camera that photographs the left rear side may be called as the second camera, and a camera that photographs the right rear side may be called as the first camera.

The monitoring device 1 according to the present embodiment is a device installed in the towing vehicle T1. The monitoring device 1 is connected to the first camera 2*a* and the second camera 2*b* by wire, wireless, or both.

Although the monitoring device 1 according to the present embodiment is realized as a single device installed in the towing vehicle T1, the configuration of the monitoring system according to the present disclosure is not limited to this.

For example, the monitoring device 1 according to the present disclosure may be realized by a combination of a plurality of devices. Furthermore, some or all of the functions of the monitoring device 1 according to the present disclosure may be realized by a device or devices installed outside the truck T.

The monitoring device 1 according to the present embodiment acquires images of the left rear side and the right rear side of the towing vehicle T1 from the first camera 2*a* and the second camera 2*b*. The monitoring device 1 detects the collision hazardous object near the truck T based on the acquired images and issues a warning to the driver.

The monitoring device 1 includes: an image acquiring section 11, a determining section 12, an area setting section 13, a detecting section 14, and a warning section 15.

The monitoring device 1 includes: a calculating unit such as a not-shown CPU (central processing unit); and storage units such as a RAM (random access memory) and a ROM (read only memory) that store programs, data, etc., for controlling the calculating unit, for example. That is, the monitoring device 1 has a function as a computer and operates based on the above programs.

Hence, each functional block configuring the monitoring device 1 shown in FIG. 2 can be realized, in terms of hardware, using the CPU and the storage units described above, and other circuits or the like, and can be realized, in terms of software, using the programs for controlling the monitoring device 1, which are stored in the storage units.

That is, the monitoring device 1 can be realized in various forms using hardware, software, or a combination of both.

Note that each program includes a set of instructions (or software codes) that causes a computer to execute one or more of the functions described in the embodiments when being loaded into the computer. The programs may be stored on a non-transitory computer-readable medium or on a tangible storage medium. As not limitation but an example, the computer-readable medium or the tangible storage medium includes: a random-access memory (RAM), a read-only memory (ROM), a flash memory, a solid-state drive (SSD), or another memory technology, a CD-ROM, a digital versatile disc (DVD), a Blu-ray (registered trademark) disk, or another optical disk storage, a magnetic cassette, a magnetic tape, a magnetic disk storage, or another magnetic storage device. The programs may be transmitted on a transitory computer-readable medium or a communication medium. As not limitation but an example, the transitory computer-readable medium or the communication medium includes electrical, optical, acoustic, or other forms of propagating signals.

The image acquiring section 11 acquires images obtained by photographing the left rear side and the right rear side of the towing vehicle T1, respectively. More specifically, the image acquiring section 11 acquires respective images from one or more cameras provided on each of the left lateral surface and the right lateral surface of the towing vehicle T1, that is, from the first camera 2*a* and the second camera 2*b*. The image acquiring section 11 outputs the acquired images to the determining section 12.

The determining section 12 acquires the respective images obtained by photographing the left rear side and the right rear side of the towing vehicle T1 from the image acquiring section 11. The determining section 12 determines whether or not the towed vehicle T2 towed by the towing vehicle T1 is present in the respective images acquired from the image acquiring section 11. This configuration allows the monitoring device 1 according to the present embodiment to grasp whether or not the truck T is turning.

The determining section 12 outputs a determination result to the area setting section 13.

For example, the determining section 12 may determine whether or not the towed vehicle T2 appears with a predetermined size or more in the acquired image. When the towed vehicle appears with the predetermined size or more in the acquired image, the determining section 12 may determine that the towed vehicle T2 is present in the image.

This configuration reduces a false determination by the determining section 12.

For example, the determining section 12 may be configured to extract a specific color corresponding to the towed vehicle T2 from the acquired image. When the proportion of the extracted color in the acquired image is equal to or larger than a predetermined size, it may be determined that the towed vehicle T2 appears with the predetermined size or more in this acquired image.

In addition, for example, the determining section 12 may use an artificial intelligence (AI) to determine whether or not the towed vehicle T2 is present in the image.

The area setting section 13 acquires from the determining section 12 the determination result regarding whether or not the towed vehicle towed by the towing vehicle is present in the images acquired by the image acquiring section 11. The area setting section 13 sets a dangerous area based on the acquired determination result. The area setting section 13 outputs information regarding the set dangerous area to the detecting section 14.

Note that the dangerous area referred to herein denotes an area where there is a high possibility that an object will collide against the truck T in accordance with movement of the truck T when the object is present in this area.

The information regarding the dangerous area referred to herein denotes information used for the detecting section 14 described later to determine a detection range of the collision hazardous object. The information regarding the dangerous area may be any information as long as it is possible to appropriately define the detection range by reading this information into the detecting section 14 described later. The information regarding the dangerous area may be coordinate information using one point of the truck T as a reference point, for example.

Hereinafter, the dangerous area set by the area setting section 13 according to the present embodiment will be described in more detail with reference to FIGS. 3A, 3B, 3C.

FIGS. 3A, 3B, 3C are schematic overhead views for describing the configuration of the area setting section according to the first embodiment. More specifically, FIGS. 3A, 3B, 3C are overhead views schematically illustrating the truck T according to the first embodiment and the dangerous area set on the lateral sides of the truck T.

FIG. 3A is a schematic overhead view illustrating the dangerous area that is set when the determining section 12 determines that the towed vehicle is not present in the images.

A situation in which the determining section 12 determines that the towed vehicle is not present in the images corresponds to a situation in which the truck T is not turning, as illustrated in FIG. 3A, for example.

In the case shown in FIG. 3A, that is, when the determining section 12 determines that the towed vehicle T2 is not present in the images, the area setting section 13 sets dangerous areas A1, A2 each having a shape extending rearward along both left and right lateral sides of the towing vehicle T1 and the towed vehicle T2.

More specifically, when the determining section 12 determines that the towed vehicle T2 is not present in the images, the area setting section 13 according to the present embodiment sets the range of dangerous areas A1, A2 extending rearward along both left and right lateral sides of the towing vehicle T1 and the towed vehicle T2.

Note that the shape extending rearward referred to herein denotes a shape at least having a boundary line in contact with the truck T extending in a substantially straight line along the lateral surfaces of the truck T traveling straight, and this shape may be, for example, rectangular as shown in FIG. 3A, or may be a sector with the camera 2*a* or 2*b* as the center point.

FIG. 3B is a schematic overhead view illustrating the dangerous area that is set when the determining section 12 determines that the towed vehicle T2 is present in the image. More specifically, FIG. 3B is a schematic overhead view illustrating the dangerous area that is set when the determining section 12 determines that the towed vehicle T2 is present in the image photographed by the first camera 2*a*.

The situation in which the determining section 12 determines that the towed vehicle T2 is present in the image photographed by the first camera 2*a* corresponds to a situation in which the truck T is turning leftward, as illustrated in FIG. 3B, for example.

When the determining section 12 determines that the towed vehicle T2 is present in the image, the area setting section 13 sets the dangerous area having a curved shape extending along the lateral surfaces of the towing vehicle T1 and the towed vehicle T2 on one lateral side of the left and right lateral sides of the towing vehicle T1 and the towed vehicle T2, the one lateral side being the side where the image in which the towed vehicle T2 is determined to be present is photographed.

Note that the dangerous area in a curved shape according to the present disclosure does not always have to be in a strictly curved shape. For example, the dangerous area in a curved shape referred to herein may be an area having a polyline-shaped boundary line including a plurality of straight lines.

In other words, in the situation shown in FIG. 3B, the area setting section 13 sets the dangerous area A3 in a curved shape extending along the lateral surfaces of the towing vehicle T1 and the towed vehicle T2 on the left lateral side of the towing vehicle T1 and the towed vehicle T2.

According to this configuration, the detecting section 14 described later can appropriately detect the collision hazardous object present on the inner wheel side of the truck T.

The area setting section 13 may set the shape of the dangerous area A3 based on the position of the towed vehicle T2 appearing in the image. In this case, for example, the area setting section 13 may set the dangerous area A3 to have a curvature becoming larger as the rear end of the towed vehicle T2 appearing in the image is located toward the lateral side.

In addition, the area setting section 13 may set the shape of the dangerous area A3 based on the size of the towed vehicle T2 appearing in the image. In this case, for example, the area setting section 13 may set the dangerous area A3 such that the larger the size of the towed vehicle T2 appearing the image is, the larger the curvature becomes.

According to this configuration, the dangerous area can be appropriately set depending on the degree of turning of the truck T.

In addition, when the determining section 12 determines that the towed vehicle T2 is present in the image, the area setting section 13 sets the dangerous area having a shape extending rearward on one of the left lateral side and the right lateral side of the towing vehicle T1. In the one of the left lateral side and the right lateral side, the image in which the towed vehicle T2 is determined to be present is not photographed. More specifically, the area setting section 13 sets the dangerous area in rectangular shape. Furthermore, this dangerous area is smaller than the dangerous area that is set when the determining section 12 determines that the towed vehicle T2 is not present in the image.

That is, in the situation shown in FIG. 3B, the area setting section 13 sets a rectangular dangerous area A4 having a smaller area than that of the dangerous area A2 on the right lateral side of the towing vehicle T1 and the towed vehicle T2.

This configuration can reduce a false detection in detection of the collision hazardous object by the detecting section 14 described later.

FIG. 3C is a schematic overhead view illustrating another example of the dangerous area that is set when the determining section 12 determines that the towed vehicle T2 is present in the image.

In this case, when the determining section 12 determines that the towed vehicle T2 is present in the image, the area setting section 13 may set the dangerous area in a curved shape extending along the lateral surfaces of the towing vehicle T1 and the towed vehicle T2 on one lateral side of the left and right lateral sides of the towing vehicle T1 and the towed vehicle T2, the one lateral side being the side where the image in which the towed vehicle T2 is determined to be present is not photographed.

In other words, in the situation as shown in FIG. 3C, the area setting section 13 my set, on the right lateral side of the towing vehicle T1 and the towed vehicle T2, a dangerous area A6 in a curved shape extending along the lateral surfaces of the towing vehicle T1 and the towed vehicle T2.

According to this configuration, the detecting section 14 described later can appropriately detect the collision hazardous object present on the outer wheel side of the truck T and can exert effects particularly when the truck T moves backward while turning.

Returning to the description of FIG. 2, the detecting section 14 acquires information regarding the dangerous area from the area setting section 13. The detecting section 14 detects the collision hazardous object present in the dangerous area. When detecting the collision hazardous object, the detecting section 14 notifies the warning section 15 of this detection.

Detecting the collision hazardous object referred to herein denotes not only completing of detection of the collision hazardous object but also attempt of detecting the collision hazardous object.

More specifically, the detecting section 14 sets the detection range based on the information regarding the dangerous area acquired from the area setting section 13 and detects the collision hazardous object present in this detection range.

For example, the detecting section 14 according to the present embodiment may acquire images photographed by the first camera 2*a* and the second camera 2*b* from the image acquiring section 11. Then, the detecting section 14 may extract a part corresponding to the dangerous area that is set from the acquired images, and then detect the collision hazardous object appearing in the extracted part.

For example, the detecting section 14 may detect the collision hazardous object from the acquired image using artificial intelligence (AI) having been trained on the images of the collision hazardous object.

When the detecting section 14 detects the collision hazardous object, the warning section 15 issues a warning to the driver of the towing vehicle. The warning section 15 may be a speaker device that emits alarm sound or warning voice or may be a display device that presents a warning statement to the driver, for example.

When the warning section 15 is a display device, the warning section 15 may acquire the image in which the collision hazardous object appears from the detecting section 14 and displays the image to the driver.

Operation of Monitoring System

Figure 4:
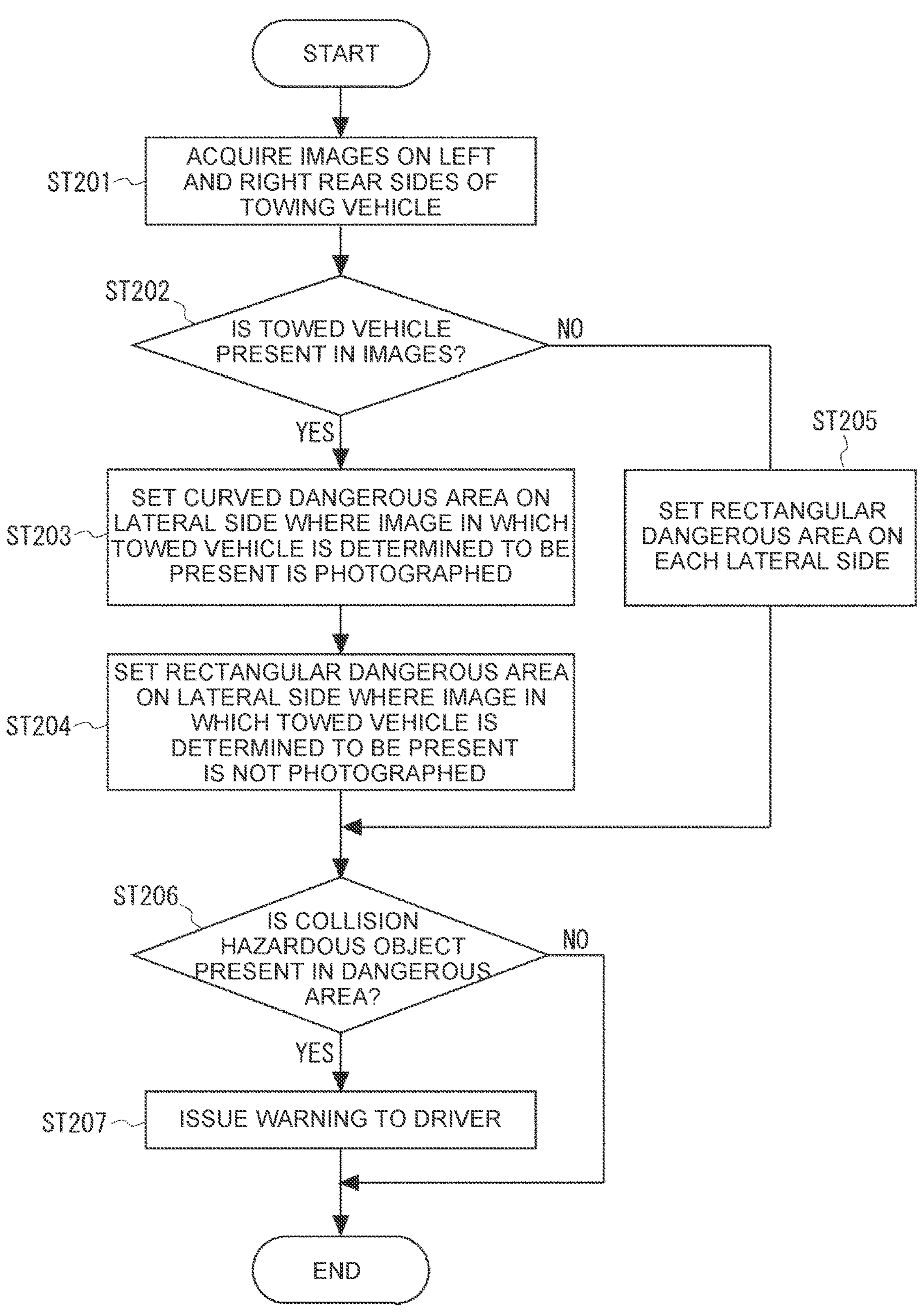
FIG. 4 is a flowchart showing the operation of the monitoring system according to the first embodiment.

Next, the operation of the monitoring system, that is, the monitoring method according to the first embodiment will be described in detail. FIG. 4 is a flowchart for describing the operation of the monitoring system according to the first embodiment. The following description will be provided with reference to FIG. 2 as appropriate.

First, the image acquiring section 11 acquires images on the left rear side and the right rear side of the towing vehicle T1 (step ST201). More specifically, the image acquiring section 11 acquires images from the first camera 2*a* and the second camera 2*b*.

Next, the determining section 12 determines whether or not the towed vehicle T2 is present in the images (step ST202). More specifically, the determining section 12 determines whether or not the towed vehicle T2 is present in the images acquired by the image acquiring section 11.

When the towed vehicle is present in the image (YES in step ST202), the area setting section 13 sets a curved dangerous area on the lateral side where the image in which the towed vehicle T2 is determined to be present is photographed (step ST203).

Then, the area setting section 13 sets a rectangular dangerous area on the lateral side where the image in which the towed vehicle is determined to be present is not photographed (step ST204).

Note that the order of execution of step ST203 and step ST204 may be reversed. Furthermore, step ST203 and step ST204 may be processes that are executed simultaneously.

When the towed vehicle is not present in the images (NO in step ST202), the area setting section 13 sets a rectangular dangerous area on each lateral side (step ST205).

Note that the dangerous area set in step ST204 is smaller than the dangerous area set in step ST205.

Next, the detecting section 14 determines whether or not the collision hazardous object is present in the dangerous area (step ST206). When the collision hazardous object is not present in the dangerous area (NO in step ST206), the monitoring system 100 terminates the series of operations.

When the collision hazardous object is present in the dangerous area (YES in step ST206), the warning section 15 issues a warning to the driver (step ST207), and the monitoring system 100 terminates the series of operations.

As described above, the monitoring system 100 according to the present embodiment acquires the respective images obtained by photographing the left rear side and the right rear side of the towing vehicle T1, and determines whether or not the towed vehicle T2 is present in the acquired images. The monitoring system 100 according to the present embodiment then sets the dangerous area based on the determination result and detects the collision hazardous object present within the setting area.

According to this configuration, the monitoring system 100 according to the present embodiment can appropriately set the dangerous area in accordance with the turning state of the truck T. As a result, the monitoring system 100 according to the present embodiment can improve the detection accuracy of the collision hazardous object.

Second Embodiment

The monitoring system according to a second embodiment is a modification of the monitoring system according to the first embodiment. The monitoring system according to the first embodiment is introduced in a truck including a towing vehicle that tows one towed vehicle; and the monitoring system according to the second embodiment is introduced in a cart including a towing vehicle that tows a plurality of towed vehicles.

FIGS. 5A, 5B, 5C are schematic overhead views for describing the configuration of the monitoring system according to the second embodiment. More specifically, FIGS. 5A, 5B, 5C are overhead views schematically illustrating a cart C according to the second embodiment and a dangerous area set on each lateral side of the cart C.

The cart C is a baggage transportation vehicle operated in a factory or the like, for example. The cart C includes a towing vehicle C1 and towed vehicles C2 to C4.

The towing vehicle C1 is a vehicle having a power engine and tows the towed vehicles C2 to C4. The towing vehicle C1 may be, for example, a vehicle that travels by autonomous driving.

The towing vehicle C1 is provided with the monitoring device 1, and the first camera 2*a* and the second camera 2*b* are provided to the lateral parts of the towing vehicle C1.

The towed vehicles C2 to C4 are vehicles including no power engines and towed by the towing vehicle C1, and are connected in a row, as shown in FIGS. 5A, 5B, 5C.

The first camera 2*a* and the second camera 2*b* are cameras attached to the lateral parts of the towing vehicle C1. As with the camera 2*a* and the camera 2*b* according to the first embodiment, the camera 2*a* and the camera 2*b* according to the present embodiment photograph the left rear side and the right rear side of the towing vehicle C1, respectively, and output photographed images to the monitoring device 1.

The monitoring device 1 has the same configuration as that of the monitoring device 1 according to the first embodiment; however, the configuration of the determining section 12 and the configuration of the area setting section 13 are partially different.

The determining section 12 according to the present embodiment detects a specific portion or portions included in the towed vehicles C2 to C4 as a target detection portion from the images acquired from the cameras 2*a*, 2*b*. The determining section 12 according to the present embodiment notifies the area setting section 13 when detecting the target detection portion or portions.

Note that the specific portion referred to herein, that is, the target detection portion may be any portion as long as this portion can be photographed by the camera 2*a* and the camera 2*b*.

For example, the target detection portion may be a corner of each towed vehicle. Further, for example, a specific pattern may be applied to the lateral surfaces of the towed vehicles C2 to C4, and the lateral surfaces of the towed vehicles C2 to C4 to which this pattern is applied may be set as the target detection portion.

The area setting section 13 according to the present embodiment sets rectangular dangerous areas A7, A8 as a default dangerous area, as shown in FIG. 5A.

When receiving a notification from the determining section 12, the area setting section 13 according to the present embodiment sets, as shown in FIG. 5B, a dangerous area A9 in a curved shape extending along the lateral surface and a rectangular dangerous area A10 smaller than the dangerous areas A7, A8, as the dangerous area at the time of the notification.

In other words, the area setting section 13 according to the present embodiment is different from the area setting section 13 of the first embodiment in that the area setting section 13 of the present embodiment is configured to always set the dangerous area initially set, and to change the shape of the dangerous area only when receiving the notification from the determining section 12.

FIG. 5C is a view showing a comparative example and showing a case in which the area setting section 13 is configured not to change the dangerous area initially set at all.

In this case, even when the cart C is turning, the area setting section 13 still sets the areas A7, A8 that are initially set as the dangerous area.

Therefore, in this case, the towed vehicles C2 to C4 are present in the area A7, resulting in a false detection.

In addition, in this case, since the dangerous area cannot include the inner wheel direction of the cart C, there is a risk that an object P1 with a high possibility to come into contact with the cart C cannot be detected as the collision hazardous object.

Furthermore, in this case, since the area A8 extends greatly in the outer wheel direction of the cart C, there is a risk that an object P2 with a lower possibility to come into contact with the cart C might be excessively detected as the collision hazardous object.

To the contrary, when receiving a notification from the determining section 12, the area setting section 13 according to the present embodiment is configured to appropriate detect the collision hazardous object by setting the area as shown in FIG. 5B.

OTHER EMBODIMENTS

The detecting section 14 according to the first embodiment and the second embodiment detects the collision hazardous object appearing in the image or images photographed by the cameras 2*a*, 2*b*, and the configuration of the detecting section 14 according to the present disclosure is not limited to this.

For example, the detecting section 14 may be configured to detect a collision hazardous object appearing in an image photographed by a photographing device other than the first camera 2*a* and the second camera 2*b*.

In this case, the monitoring system 100 may further include a photographing device or devices that photograph the lateral side of the towing vehicle or the towed vehicles, or both lateral sides thereof, for example. Then, the detecting section 14 may be configured to detect the collision hazardous object appearing in the image or images photographed by the photographing devices.

The above-mentioned photographing device may be provided to the lateral surface of the towed vehicle T2, for example.

Furthermore, the monitoring system 100 according to the first embodiment and the second embodiment issues a warning to the driver when the detecting section 14 detects the collision hazardous object; however, the monitoring system according to the present disclosure is not limited to this.

For example, the monitoring system 100 according to the present disclosure may be configured to restrict part of the operation of the truck T when the detecting section 14 detects the collision hazardous object.

The present disclosure has been described in accordance with the above embodiments, and the present disclosure is not limited only to the configurations of the above-mentioned embodiments; and it is needless to mention that within the scope of the disclosure of the claims of the present application, the present disclosure includes various changes, modifications, and combinations that can be made by those skilled in the art.

Part or all of the above-mentioned embodiments can also be described as following supplements but is not limited to the following.

(Supplement 1)

A monitoring system comprising:

an image acquiring section that acquires images obtained by photographing a left rear side and a right rear side of a towing vehicle, respectively;

a determining section that determines whether or not a towed vehicle towed by the towing vehicle is present in the respective images;

an area setting section that, when the determining section determines that the towed vehicle is present in the image, sets a dangerous area having a curved shape extending along lateral surfaces of the towing vehicle and the towed vehicle on one lateral side of a left lateral side and a right lateral side of the towing vehicle and the towed vehicle, the one lateral side being a side where the image in which the towed vehicle is determined to be present is photographed; and a detecting section that detects a collision hazardous object present in the dangerous area.

(Supplement 2)

The monitoring system according to Supplement 1, wherein the acquiring section acquires the images from one or more cameras disposed to each of left and right lateral surfaces of the towing vehicle.

(Supplement 3)

The monitoring system according to Supplement 1 or 2, wherein, when the towed vehicle appears with a predetermined size or more in the image, the determining section determines that the towed vehicle is present in the image.

(Supplement 4)

The monitoring system according to any one of Supplements 1 to 3, wherein the area setting section changes the shape of the dangerous area based on the position of the towed vehicle appearing in the image.

(Supplement 5)

The monitoring system according to any one of Supplements 1 to 4, wherein the area setting section sets the dangerous area based on the size of the towed vehicle appearing in the image.

(Supplement 6)

The monitoring system according to Supplement 5, wherein the area setting section sets the dangerous area such that the larger the size of the towed vehicle appearing the image is, the larger the curvature becomes.

(Supplement 7)

The monitoring system according to any one of Supplements 1 to 6, wherein, when the determining section determines that the towed vehicle is not present in the images, the area setting section sets the dangerous area having a shape extending rearward on each of left and right lateral sides of the towing vehicle and the towed vehicle.

(Supplement 8)

The monitoring system according to Supplement 7, wherein, when the determining section determines that the towed vehicle is not present in the images, the area setting section sets the dangerous area having a rectangular shape on each of left and right lateral sides of the towing vehicle and the towed vehicle.

(Supplement 9)

The monitoring system according to Supplement 7 or 8, wherein when the determining section determines that the towed vehicle is present in the image, the dangerous area having a shape extending rearward is set on one lateral side of the left lateral side and the right lateral side of the towing vehicle, the one lateral side being a side where the image in which the towed vehicle is determined to be present is not photographed, and the dangerous area is smaller than the dangerous area that is set when the determining section determines that the towed vehicle is not present in the image.

(Supplement 10)

The monitoring system according to Supplement 9, wherein when the determining section determines that the towed vehicle is present in the image, the dangerous area having a rectangular shape is set on one lateral side of the left lateral side and the right lateral side of the towing vehicle, the one lateral side being a side where the image in which the towed vehicle is determined to be present is not photographed, and the dangerous area is smaller than the dangerous area that is set when the determining section determines that the towed vehicle is not present in the image.

(Supplement 11)

The monitoring system according to any one of Supplements 1 to 8, wherein, when the determining section determines that the towed vehicle is present in the image, a dangerous area having a curved shape extending along lateral surfaces of the towing vehicle and the towed vehicle is set on one lateral side of the left lateral side and the right lateral side of the towing vehicle and the towed vehicle, the one lateral side being a side where the image in which the towed vehicle is determined to be present is not photographed.

(Supplement 12)

The monitoring system according to any one of Supplements 1 to 11, wherein the detecting section detects the collision hazardous object appearing in the image.

(Supplement 13)

The monitoring system according to any one of Supplements 1 to 12, further including a photographing section that photographs the lateral side of the towing vehicle or the towed vehicle, or both lateral sides of the towing vehicle and the towed vehicle, and the detecting section detects the collision hazardous object appearing in image data photographed by the photographing section.

(Supplement 14)

The monitoring system according to any one of Supplements 1 to 13, further including a warning section that issues a warning to a driver of the towing vehicle when the detecting section detects the collision hazardous object.

(Supplement 15)

A monitoring device comprising:

an image acquiring section that acquires images obtained by photographing a left rear side and a right rear side of a towing vehicle, respectively;

a determining section that determines whether or not a towed vehicle towed by the towing vehicle is present in the respective images;

an area setting section that, when the determining section determines that the towed vehicle is present in the image, sets a dangerous area having a curved shape extending along lateral surfaces of the towing vehicle and the towed vehicle on one lateral side of a left lateral side and a right lateral side of the towing vehicle and the towed vehicle, the one lateral side being a side where the image in which the towed vehicle is determined to be present is photographed; and a detecting section that detects a collision hazardous object present in the dangerous area.

(Supplement 16)

A monitoring method in which a computer executes:

acquiring images obtained by photographing a left rear side and a right rear side of a towing vehicle, respectively;

determining whether or not a towed vehicle towed by the towing vehicle is present in the respective images;

when the towed vehicle is determined to be present in the image, setting a dangerous area having a curved shape extending along lateral surfaces of the towing vehicle and the towed vehicle on one lateral side of a left lateral side and a right lateral side of the towing vehicle and the towed vehicle, the one lateral side being a side where the image in which the towed vehicle is determined to be present is photographed; and detecting a collision hazardous object present in the dangerous area.

(Supplement 17)

A monitoring program causing a computer to execute:

acquiring images obtained by photographing a left rear side and a right rear side of a towing vehicle, respectively;

determining whether or not a towed vehicle towed by the towing vehicle is present in the respective images;

when the towed vehicle is determined to be present in the image, setting a dangerous area having a curved shape extending along lateral surfaces of the towing vehicle and the towed vehicle on one lateral side of a left lateral side and a right lateral side of the towing vehicle and the towed vehicle, the one lateral side being a side where the image in which the towed vehicle is determined to be present is photographed; and detecting a collision hazardous object present in the dangerous area.

What is claimed is:

1. A monitoring system comprising:

a processor programmed to:

acquire images obtained by photographing including a left rear side image and a right rear side image of a towing vehicle;

determine whether or not a towed vehicle towed by the towing vehicle is present in the acquired images;

determine which of the left rear side image and the right rear side image includes the towed vehicle;

when it is determined that the towed vehicle is present in the image:

set a dangerous area having a curved shape extending along a lateral surface of the towing vehicle and the towed vehicle on only a lateral side of the towing vehicle and the towed vehicle corresponding to the image including the towed vehicle; and set a different shaped area on a lateral side of the towing vehicle and the towed vehicle opposite from the lateral side of the towing vehicle and the towed vehicle corresponding the image including the towed vehicle; and detect a collision hazardous object present in the dangerous area.

2. The monitoring system according to claim 1, wherein, the processor is programmed to, when it is determined that the towed vehicle is not present in the images, set the dangerous area having a shape extending rearward on each lateral side of the towing vehicle and the towed vehicle.

3. The monitoring system according to claim 1, wherein the different shaped area set on the lateral side opposite the image including the towed vehicle has a shape extending rearward and is smaller than the dangerous area that is set when it is determined that the towed vehicle is not present in the image.

4. A monitoring method in which a computer executes:

acquiring images obtained by photographing including a left rear side image and a right rear side image of a towing vehicle;

determining whether or not a towed vehicle towed by the towing vehicle is present in the respective images;

determining which of the left rear side image and the right rear side image includes the towed vehicle;

when the towed vehicle is determined to be present in the image:

setting a dangerous area having a curved shape extending along a lateral surface of the towing vehicle and the towed vehicle on only a lateral side of the towing vehicle and the towed vehicle corresponding to the image including the towed vehicle; and setting a different shaped area on a lateral side of the towing vehicle and the towed vehicle opposite from the lateral side of the towing vehicle and the towed vehicle corresponding to the image including the towed vehicle; and detecting a collision hazardous object present in the dangerous area.

* * * * *